United States Patent
Sawanishi et al.

(10) Patent No.: US 11,904,404 B2
(45) Date of Patent: *Feb. 20, 2024

(54) RESISTANCE SPOT WELDING METHOD AND WELD MEMBER PRODUCTION METHOD

(71) Applicant: JFE STEEL CORPORATION, Tokyo (JP)

(72) Inventors: Chikaumi Sawanishi, Tokyo (JP); Hiroshi Matsuda, Tokyo (JP); Rinsei Ikeda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 623 days.

This patent is subject to a terminal disclaimer.

(21) Appl. No.: 16/973,766

(22) PCT Filed: Jun. 17, 2019

(86) PCT No.: PCT/JP2019/023966
§ 371 (c)(1),
(2) Date: Dec. 10, 2020

(87) PCT Pub. No.: WO2020/004116
PCT Pub. Date: Jan. 2, 2020

(65) Prior Publication Data
US 2021/0252629 A1   Aug. 19, 2021

(30) Foreign Application Priority Data
Jun. 29, 2018  (JP) .................. 2018-125392

(51) Int. Cl.
*B23K 11/25* (2006.01)
*B23K 11/11* (2006.01)
*B23K 11/16* (2006.01)

(52) U.S. Cl.
CPC ........... *B23K 11/257* (2013.01); *B23K 11/115* (2013.01); *B23K 11/16* (2013.01)

(58) Field of Classification Search
CPC ....... B23K 11/11; B23K 11/115; B23K 11/16; B23K 11/166; B23K 11/24; B23K 11/241;
(Continued)

(56) References Cited

U.S. PATENT DOCUMENTS 6,057,523 A   5/2000 Fujii et al.
6,130,396 A   10/2000 Hasegawa et al.
(Continued)

FOREIGN PATENT DOCUMENTS

CN   105073326 A   11/2015
CN   107405717 A   11/2017
(Continued)

OTHER PUBLICATIONS

Aug. 20, 2021, the Extended European Search Report issued by the European Patent Office in the corresponding European Patent Application No. 19826067.1.
(Continued)

*Primary Examiner* — Hung D Nguyen
(74) *Attorney, Agent, or Firm* — KENJA IP LAW PC

(57) ABSTRACT

A resistance spot welding method comprises: performing test welding; and performing actual welding after the test welding, wherein in the test welding, $0.2 \leq Vtp/Vtm \leq 1.5$ is satisfied where Vtm is an average value of a voltage between the electrodes in main current passage in the test welding and Vtp is an average value of a voltage between the electrodes in subsequent current passage in the test welding, and in each of main current passage and subsequent current passage in the actual welding, a time variation curve of an instantaneous amount of heat generated per unit volume and
(Continued)

a cumulative amount of heat generated per unit volume that are stored in a corresponding one of the main current passage and the subsequent current passage in the test welding are set as a target, and adaptive control welding is performed to control a current passage amount according to the target.

16 Claims, 4 Drawing Sheets

(58) Field of Classification Search
CPC ... B23K 11/252; B23K 11/255; B23K 11/256; B23K 11/257; B23K 11/258; B23K 31/125; B23K 2101/006; B23K 2101/18; B23K 2101/185; B23K 2103/04
See application file for complete search history.

(56) References Cited

U.S. PATENT DOCUMENTS

| | | | |
|---|---|---|---|
| 9,895,764 | B2 | 2/2018 | Okita et al. |
| 10,328,518 | B2 | 6/2019 | Okita et al. |
| 10,625,368 | B2 | 4/2020 | Sawanishi et al. |
| 10,773,334 | B2 | 9/2020 | Sawanishi et al. |
| 2010/0065533 | A1* | 3/2010 | Buda ................ B23K 11/115 219/110 |
| 2010/0282717 | A1 | 11/2010 | Ananthanarayanan |
| 2012/0248086 | A1* | 10/2012 | Watanabe ........... B23K 11/257 219/162 |
| 2013/0020288 | A1 | 1/2013 | Moision et al. |
| 2013/0032578 | A1 | 2/2013 | Trapp et al. |
| 2014/0305912 | A1 | 10/2014 | Taniguchi et al. |
| 2016/0008913 | A1 | 1/2016 | Okita et al. |
| 2016/0008914 | A1 | 1/2016 | Okita et al. |
| 2016/0082543 | A1* | 3/2016 | Wakabayashi ........ B23K 11/16 219/86.31 |
| 2016/0236294 | A1 | 8/2016 | Sawanishi et al. |
| 2016/0271720 | A1* | 9/2016 | Sawanishi ........... B23K 11/115 |
| 2017/0072502 | A1* | 3/2017 | Karagoulis ........... B23K 11/16 |
| 2017/0113295 | A1 | 4/2017 | Sawanishi et al. |
| 2017/0284970 | A1 | 10/2017 | Edwards, II et al. |
| 2019/0344376 | A1 | 11/2019 | Sawanishi et al. |

FOREIGN PATENT DOCUMENTS

| | | |
|---|---|---|
| EP | 3290146 A1 | 3/2018 |
| JP | H09216071 A | 8/1997 |
| JP | H1094883 A | 4/1998 |
| JP | H1133743 A | 2/1999 |
| JP | 2003236674 A | 8/2003 |
| JP | 2006043731 A | 2/2006 |
| JP | 2010221284 A | 10/2010 |
| WO | 2014136507 A1 | 9/2014 |
| WO | 2016147551 A1 | 9/2016 |
| WO | 2016174842 A1 | 11/2016 |
| WO | 2017212916 A1 | 12/2017 |

OTHER PUBLICATIONS

Sep. 3, 2019, International Search Report issued in the International Patent Application No. PCT/JP2019/023966.

Mar. 13, 2023, Communication pursuant to Article 94(3) EPC issued by the European Patent Office in the corresponding European Patent Application No. 19826067.1.

Sep. 30, 2021, Office Action issued by the China National Intellectual Property Administration in the corresponding Chinese Patent Application No. 201980039788.8 with English language concise statement of relevance.

* cited by examiner

RESISTANCE SPOT WELDING METHOD AND WELD MEMBER PRODUCTION METHOD

TECHNICAL FIELD

The present disclosure relates to a resistance spot welding method. The present disclosure is particularly intended to ensure a stable nugget diameter and improve joint strength in a sheet combination including one or more high strength steel sheets even in the case where the effect of a disturbance such as current shunting or a sheet gap is significant.

BACKGROUND

Overlapping steel sheets are typically joined by resistance spot welding which is one type of lap resistance welding.

Resistance spot welding is a method of squeezing two or more overlapping steel sheets by a pair of electrodes from above and below and, while applying an electrode force, passing a high welding current between the upper and lower electrodes for a short time to join the steel sheets. Heat generated from the resistance to the flow of the high welding current is used to obtain a spot weld. The spot weld is called a nugget, and results from the overlapping steel sheets melting and solidifying at their contact portion when the current flows through the steel sheets. The steel sheets are spot-joined by this nugget.

For good weld quality, it is important to form the nugget with a diameter in an appropriate range. The nugget diameter depends on the welding condition such as welding current, welding time, electrode shape, and electrode force. To achieve an appropriate nugget diameter, the welding condition needs to be set appropriately according to the parts-to-be-welded condition such as the material, the sheet thickness, and the number of overlapping sheets of the parts to be welded.

In vehicle manufacturing, for example, spot welding is performed at several thousand points per vehicle, and parts to be welded (workpieces) conveyed one after another need to be welded. If the state of the parts to be welded such as the material, the sheet thickness, and the number of overlapping sheets of the parts to be welded is the same at each welding location, the same welding condition such as welding current, welding time, and electrode force can be used to obtain the same nugget diameter. In continuous welding, however, the contact surfaces of the electrodes with the parts to be welded wear gradually and the contact areas widen gradually as compared with the initial state. When the same welding current as in the initial state is passed in such a state in which the contact areas have widened, the current density in the parts to be welded decreases and the temperature rise of the weld decreases, resulting in a decrease in nugget diameter. Accordingly, the electrodes are dressed or replaced every several hundred to several thousand welding points, to prevent the electrode tip diameter from increasing excessively.

A resistance welding device having a function (stepper function) of increasing the welding current after a predetermined number of welding operations to compensate for a decrease in current density associated with electrode wear has been conventionally used, too. To use the stepper function, the above-mentioned welding current change pattern needs to be set appropriately beforehand. However, considerable time and cost are required to derive appropriate welding current change patterns corresponding to numerous welding conditions and parts-to-be-welded conditions through tests and the like. Besides, since the state of progress of electrode wear varies in actual work, the welding current change pattern set beforehand may not always be appropriate.

In addition, in the case where there is a disturbance during welding, such as when a point that has already been welded (hereafter also referred to as "existing weld") is present near the current welding point or when the parts to be welded have considerable surface roughness and a contact point of the parts to be welded is present near the welding point, part of the current is shunted into such existing weld or contact point during welding. In this state, even when welding is performed under a predetermined condition, the current density at the position to be welded which is directly above and below the electrodes decreases, and so a nugget of a required diameter cannot be obtained. To compensate for such an insufficient amount of heat generated and obtain a nugget of a required diameter, a higher welding current needs to be set beforehand.

Moreover, in the case where the surroundings of the welding point are strongly restrained due to surface roughness, member shape, etc. or in the case where foreign matter is present between the steel sheets around the welding point, a larger sheet gap between the steel sheets causes a smaller contact diameter of the steel sheets, which may facilitate expulsion (splash).

The following techniques have been proposed to solve the problems stated above.

For example, JP 2003-236674 A (PTL 1) discloses a spot welding method for high tensile strength steel sheets whereby spot welding is performed through the following steps to suppress expulsion caused by poor fitness in an initial stage of current passage: a first step of gradually increasing the current to high tensile strength steel sheets to form a nugget; a second step of decreasing the current after the first step; and a third step of, after the second step, increasing the current to perform actual welding and gradually decreasing the current.

JP 2006-43731 A (PTL 2) discloses a current control method in spot welding whereby such a current that can suppress spattering is maintained for a predetermined time in an initial part of welding time to soften the surfaces of parts to be welded and then a high current is maintained for a predetermined time to grow a nugget while suppressing spattering.

JP H9-216071 A (PTL 3) discloses a control unit of a resistance welder that compares an estimated temperature distribution of a weld and a target nugget and controls the output of the welder to obtain the set nugget diameter.

JP H10-94883 A (PTL 4) discloses a welding condition control method for a resistance welder of detecting the welding current and the voltage between tips, simulating a weld through heat transfer calculation, and estimating the nugget formation state in the weld during welding to achieve good welding.

JP H11-33743 A (PTL 5) discloses a resistance welding system that calculates, from the sheet thickness of parts to be welded and the welding time, the cumulative amount of heat generated per unit volume with which good welding of the parts to be welded is possible, and adjusts the welding current or voltage to generate the calculated amount of heat per unit volume and per unit time, to achieve good welding regardless of the type of the parts to be welded or the wear state of the electrodes.

CITATION LIST

Patent Literatures
PTL 1: JP 2003-236674 A
PTL 2: JP 2006-43731 A
PTL 3: JP H9-216071 A
PTL 4: JP H10-94883 A
PTL 5: JP H11-33743 A

SUMMARY (Technical Problem)

However, with the techniques described in PTL 1 and PTL 2, given that an appropriate welding condition varies depending on the presence or absence of a disturbance and the magnitude of the disturbance, a desired nugget diameter cannot be ensured without expulsion when a larger sheet gap or current shunting than expected occurs.

The techniques described in PTL 3 and PTL 4 need complex calculation to estimate the nugget temperature based on a heat transfer model (heat transfer simulation) and the like. This requires a welding control unit that is not only complex in structure but also expensive.

Moreover, the techniques described in PTL 1 to PTL 5 are not concerned with a method of improving joint strength in welding of a sheet combination including one or more high strength steel sheets.

It could therefore be helpful to provide a resistance spot welding method that can obtain a nugget of an appropriate diameter and also improve joint strength (hereafter also referred to as "joint strength of high strength steel sheets") in welding of a sheet combination including one or more high strength steel sheets (specifically, one or more steel sheets having a tensile strength of 590 MPa or more, and particularly a tensile strength of 980 MPa or more), regardless of whether there is a disturbance.

It could also be helpful to provide a weld member production method of joining a plurality of overlapping metal sheets by the resistance spot welding method.

(Solution to Problem)

We conducted intensive study to achieve the object stated above, and discovered the following:

If there is a disturbance such as current shunting or a sheet gap, the obtained nugget diameter varies even when welding is performed by constant current control under the same condition as in the case where there is no disturbance, as mentioned above.

By performing test welding beforehand and then performing actual welding by adaptive control welding that controls the current passage amount (the current and the voltage between electrodes) with the cumulative amount of heat generated that is obtained by the test welding being set as the target, appropriate current passage can be performed with the effect of a disturbance being taken into consideration. Consequently, a certain nugget diameter can be obtained regardless of a disturbance.

Moreover, an effective way of ensuring necessary joint strength in a sheet combination including one or more high strength steel sheets is to perform subsequent current passage for heat treatment of a weld after main current passage for nugget formation.

However, if the subsequent current passage is performed by adaptive control in the presence of a disturbance, the current density distribution of the weld and thus the heat generation pattern change due to the disturbance in some cases, making it impossible to achieve the predetermined heat treatment effect. For example, if the subsequent current passage is performed by adaptive control in a state in which the effect of current shunting is considerable, the current density near the contact ends with the electrodes increases excessively due to the effect of current shunting and surface expulsion (surface splashing) occurs in some cases, making it impossible to achieve the predetermined heat treatment effect. There are also cases where current control by adaptive control lags behind and a target amount of heat cannot be generated, making it impossible to achieve the predetermined heat treatment effect.

We examined this point more closely, and discovered the following:

In the case where there is a disturbance, the condition of the subsequent current passage needs to be set more strictly than in the case where there is no disturbance. In view of this, we looked at the voltage between the electrodes which is one of the parameters that are important indexes for determining the current in adaptive control welding.

We consequently discovered that, even in the case where the subsequent current passage is performed by adaptive control in a state in which there is a disturbance, the sufficient heat treatment effect can be obtained to thus achieve the intended object, by:

optimizing the ratio of the average value of the voltage between the electrodes in the subsequent current passage to the average value of the voltage between the electrodes in the main current passage in the test welding (hereafter also referred to as the "voltage ratio between the main current passage and the subsequent current passage in the test welding"), and then performing the subsequent current passage in the test welding by constant current control, and storing a time variation curve of an instantaneous amount of heat generated per unit volume and a cumulative amount of heat generated per unit volume in the subsequent current passage in the test welding performed under the appropriate condition, and performing the subsequent current passage in the actual welding by adaptive control, with the stored time variation curve of the instantaneous amount of heat generated per unit volume and cumulative amount of heat generated per unit volume in the subsequent current passage in the test welding being set as a target.

The present disclosure is based on these discoveries and further studies.

We thus provide:

1. A resistance spot welding method of squeezing, by a pair of electrodes, parts to be welded which are a plurality of overlapping metal sheets, and passing a current while applying an electrode force to join the parts to be welded, the resistance spot welding method comprising: performing test welding; and performing actual welding after the test welding, wherein (a) in the test welding, main current passage for nugget formation and subsequent current passage for subsequent heat treatment are performed, in the main current passage in the test welding, a time variation curve of an instantaneous amount of heat generated per unit volume and a cumulative amount of heat generated per unit volume that are calculated from an electrical property between the electrodes in forming an appropriate nugget by performing current passage by constant current control are stored, and in the subsequent current passage in the test welding, current passage is performed by constant current control under a condition:

$0.2 \leq Vtp/Vtm \leq 1.5$, where Vtm is an average value of a voltage between the electrodes in the main current passage in the test welding and Vtp is an average value of a voltage between the electrodes in the subsequent current passage in the test welding, and a time variation curve of an instantaneous amount of heat generated per unit volume and a cumulative amount of heat generated per unit volume that are calculated from an electrical property between the electrodes in the current passage performed under the condition are stored, and (b) thereafter, in the actual welding, main current passage for nugget formation and subsequent current passage for subsequent heat treatment are performed, and in the main current passage and the subsequent current passage in the actual welding, the time variation curve of the instantaneous amount of heat generated per unit volume and the cumulative amount of heat generated per unit volume that are stored in the main current passage in the test welding and the time variation curve of the instantaneous amount of heat generated per unit volume and the cumulative amount of heat generated per unit volume that are stored in the subsequent current passage in the test welding are respectively set as a target, and adaptive control welding is performed to control a current passage amount according to the target.

2. The resistance spot welding method according to 1., wherein in the adaptive control welding in the main current passage in the actual welding, in the case where an amount of time variation of an instantaneous amount of heat generated per unit volume differs from the time variation curve of the instantaneous amount of heat generated per unit volume set as the target, the current passage amount is controlled in order to compensate for the difference from the time variation curve within a remaining welding time in the main current passage in the actual welding so that a cumulative amount of heat generated per unit volume in the main current passage in the actual welding matches the cumulative amount of heat generated per unit volume set as the target.

3. The resistance spot welding method according to 1. or 2., wherein in the adaptive control welding in the subsequent current passage in the actual welding, in the case where an amount of time variation of an instantaneous amount of heat generated per unit volume differs from the time variation curve of the instantaneous amount of heat generated per unit volume set as the target, the current passage amount is controlled in order to compensate for the difference from the time variation curve within a remaining welding time in the subsequent current passage in the actual welding so that a cumulative amount of heat generated per unit volume in the subsequent current passage in the actual welding matches the cumulative amount of heat generated per unit volume set as the target.

4. The resistance spot welding method according to any one of 1. to 3., wherein a cooling time is set between the main current passage and the subsequent current passage in the test welding, and the number of repetitions of a welding interval for the cooling time and the subsequent current passage after the main current passage in the test welding is two or more times.

5. A weld member production method comprising joining a plurality of overlapping metal sheets by the resistance spot welding method according to any one of 1. to 4.

(Advantageous Effect)

It is thus possible to stably ensure a certain nugget diameter and achieve high joint strength in a sheet combination including one or more high strength steel sheets, regardless of whether there is a disturbance.

It is also possible to stably ensure a desired nugget diameter by effectively responding to variations in the disturbance state, even when continuously welding parts to be welded which are conveyed one after another in real operation such as vehicle manufacturing (even when the disturbance state varies among welding positions or parts to be welded). This is very advantageous in improving operating efficiency and yield rate.

DETAILED DESCRIPTION

Figure 1A:
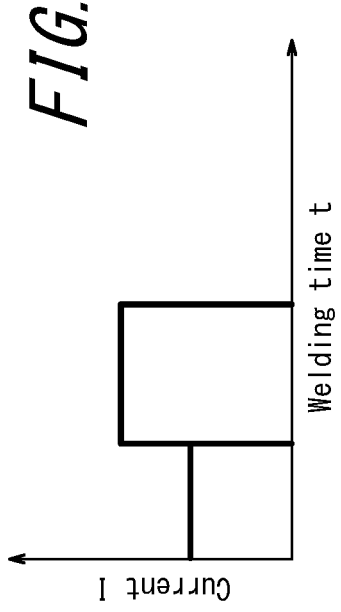
FIG. 1A is a diagram illustrating an example of a current pattern in main current passage in test welding.

The presently disclosed techniques will be described below by way of embodiments.

One of the disclosed embodiments relates to a resistance spot welding method of squeezing, by a pair of electrodes, parts to be welded which are a plurality of overlapping metal sheets, and passing a current while applying an electrode force to join the parts to be welded, the resistance spot welding method comprising: performing test welding; and performing actual welding after the test welding, wherein (a) in the test welding, main current passage for nugget formation and subsequent current passage for subsequent heat treatment are performed, in the main current passage in the test welding, a time variation curve of an instantaneous amount of heat generated per unit volume and a cumulative amount of heat generated per unit volume that are calculated from an electrical property between the electrodes in forming an appropriate nugget by performing current passage by constant current control are stored, and in the subsequent current passage in the test welding, current passage is performed by constant current control under a condition:

$0.2 \leq Vtp/Vtm \leq 1.5$,
where Vtm is an average value of a voltage between the electrodes in the main current passage in the test welding and Vtp is an average value of a voltage between the electrodes in the subsequent current passage in the test welding, and a time variation curve of an instantaneous amount of heat generated per unit volume and a cumulative amount of heat generated per unit volume that are calculated from an electrical property between the electrodes in the current passage performed under the condition are stored, and (b) thereafter, in the actual welding, main current passage for nugget formation and subsequent current passage for subsequent heat treatment are performed, and in the main current passage and the subsequent current passage in the actual welding, the time variation curve of the instantaneous amount of heat generated per unit volume and the cumulative amount of heat generated per unit volume that are stored in the main current passage in the test welding and the time variation curve of the instantaneous amount of heat generated per unit volume and the cumulative amount of heat generated per unit volume that are stored in the subsequent current passage in the test welding are respectively set as a target, and adaptive control welding is performed to control a current passage amount according to the target.

Any welding device that includes a pair of upper and lower electrodes and is capable of freely controlling each of the electrode force and the welding current during welding may be used in the resistance spot welding method according to one of the disclosed embodiments. The force mechanism (air cylinder, servomotor, etc.), the type (stationary, robot gun, etc.), the electrode shape, and the like are not limited. Herein, the "electrical property between the electrodes" means the interelectrode resistance or the voltage between the electrodes.

The test welding and the actual welding in the resistance spot welding method according to one of the disclosed embodiments will be described below.

Test welding

In the test welding, main current passage for nugget formation and subsequent current passage for subsequent heat treatment are each performed by constant current control.

In the main current passage in the test welding, a time variation curve of an instantaneous amount of heat generated per unit volume and a cumulative amount of heat generated per unit volume that are calculated from an electrical property between the electrodes in forming an appropriate nugget by performing current passage by constant current control are stored.

The test welding may be performed in a state in which there is no disturbance, or performed in a state in which there is a disturbance such as current shunting or a sheet gap (i.e. a state assuming that there is a disturbance).

Figure 1B:
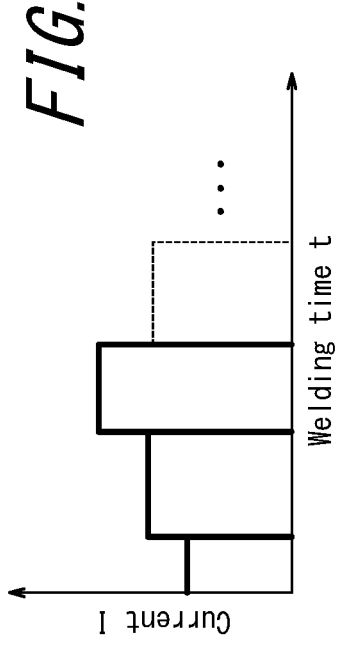
FIG. 1B is a diagram illustrating an example of a current pattern in main current passage in test welding.
Figure 1C:
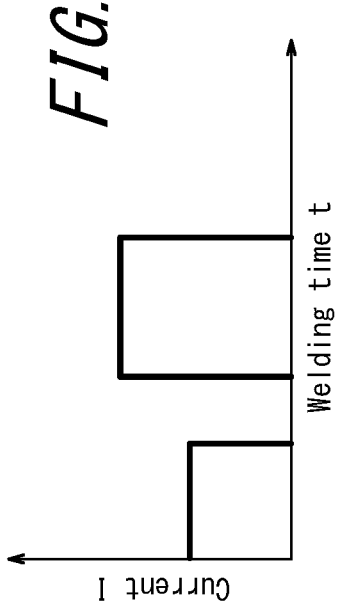
FIG. 1C is a diagram illustrating an example of a current pattern in main current passage in test welding.
Figure 1D:
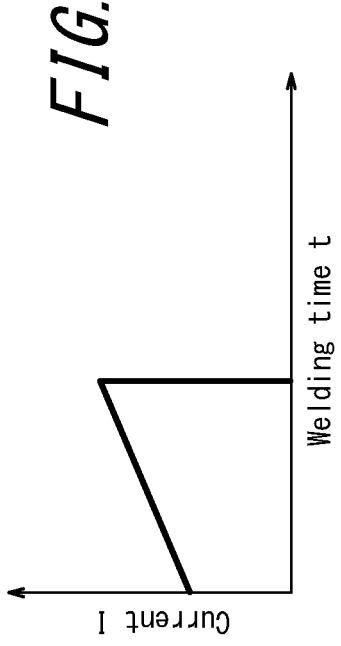
FIG. 1D is a diagram illustrating an example of a current pattern in main current passage in test welding.
Figure 1E:
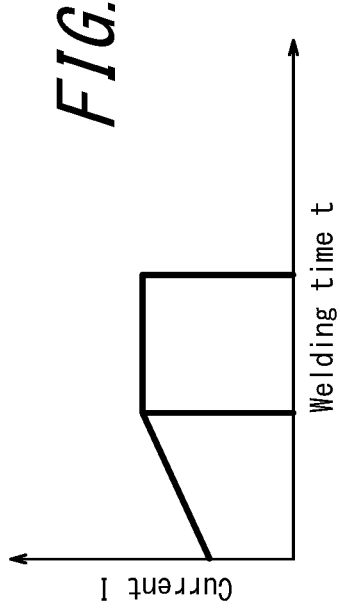
FIG. 1E is a diagram illustrating an example of a current pattern in main current passage in test welding.
Figure 1F:
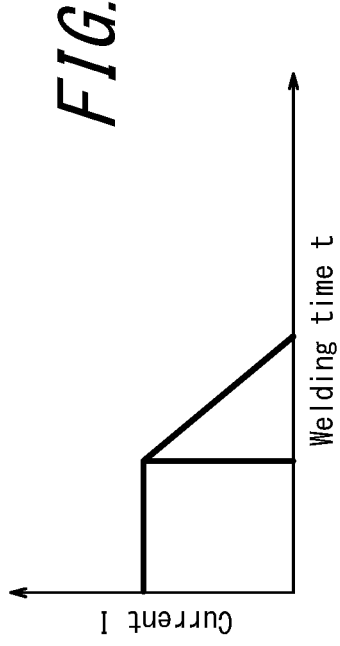
FIG. 1F is a diagram illustrating an example of a current pattern in main current passage in test welding.

The current pattern in the main current passage in the test welding may be a current pattern of a constant current throughout the current passage. The current pattern may be a current pattern divided into two or more steps each of which has a constant current, as illustrated in FIGS. 1A and 1B. The current pattern may be a current pattern of two or more steps with a cooling time being provided therebetween, as illustrated in FIG. 1C. The current pattern may be a current pattern in slope form, as illustrated in FIGS. 1D to 1F. The current pattern may be any combination of these patterns.

Herein, the "constant current control" includes not only a current pattern of a constant current throughout the current passage, but also the current patterns illustrated in FIGS. 1A to 1F, and any current patterns combining these current patterns. The same applies to constant current control performed in the subsequent current passage in the test welding.

In the subsequent current passage in the test welding, it is important to perform current passage by constant current control under the condition:
$0.2 \leq Vtp/Vtm \leq 1.5$,
where Vtm is the average value of the voltage between the electrodes in the main current passage and Vtp is the average value of the voltage between the electrodes in the subsequent current passage, and store a time variation curve of an instantaneous amount of heat generated per unit volume and a cumulative amount of heat generated per unit volume that are calculated from an electrical property between the electrodes in the current passage performed under the condition.

As mentioned above, if the subsequent current passage in the below-described actual welding is performed by adaptive control in the presence of a disturbance, the current density distribution of the weld and thus the heat generation pattern change due to the disturbance in some cases, making it impossible to achieve the predetermined heat treatment effect.

In view of this, by performing the subsequent current passage in the test welding under the foregoing condition, the current density of the weld and the amount of heat generated can be prevented from increasing excessively in the subsequent current passage in the actual welding by adaptive control. For example, even when the subsequent current passage in the actual welding is performed by adaptive control in a state in which current shunting is considerable, excessive heat generation near the electrode surface can be prevented, and surface expulsion can be prevented. Hence, by storing the time variation curve of the instantaneous amount of heat generated per unit volume and the cumulative amount of heat generated per unit volume in the subsequent current passage in the test welding and performing the subsequent current passage in the actual welding by adaptive control using the stored values as the target, even in the case where there is a disturbance, the amount of heat generated in the subsequent current passage in the actual welding can be controlled within such a range that achieves the predetermined heat treatment effect.

It is therefore important to satisfy:
$0.2 \leq Vtp/Vtm \leq 1.5$
in the subsequent current passage in the test welding.

In particular, for example in the case where the effect of a disturbance is significant, it is more preferable to satisfy:
$0.4 \leq Vtp/Vtm \leq 1.4$.

In each of the main current passage and the subsequent current passage, in the case where a cooling time is provided during the current passage, a time average of the voltage between the electrodes during the current passage excluding the cooling time is used.

In detail, in each of the main current passage and the subsequent current passage, a value obtained by dividing a time integration value of the voltage between the electrodes in the current passage by the total welding time in the current passage excluding the cooling time is taken to be the average value of the voltage between the electrodes in the current passage.

A preferable range of the current in the main current passage in the test welding varies depending on which sheet combination is used as the parts to be welded. For example, in the case of using a sheet combination of two overlapping steel sheets of 980 MPa-grade in tensile strength (TS) and 1.2 mm to 1.6 mm in sheet thickness, the current in the main current passage in the test welding is preferably in a range of 3.0 kA to 12.0 kA.

The total welding time in the main current passage in the test welding excluding the cooling time is preferably in a range of 60 ms to 1000 ms.

The welding time per one subsequent current passage in the test welding is preferably in a range of 20 ms to 3000 ms. The welding time per one subsequent current passage is more preferably in a range of 60 ms to 3000 ms.

Actual welding

After the test welding, the actual welding is performed.

In the main current passage in the actual welding, the time variation curve of the instantaneous amount of heat generated per unit volume and the cumulative amount of heat generated per unit volume that are stored in the main current passage in the test welding are set as a target, and adaptive control welding is performed to control a current passage amount according to the target.

For example, in the adaptive control welding in the main current passage in the actual welding, welding is performed with the time variation curve of the instantaneous amount of heat generated per unit volume and the cumulative amount of heat generated per unit volume that are stored in the main current passage in the test welding being set as the target. If the amount of time variation of the instantaneous amount of heat generated per unit volume follows the time variation curve, the welding is continued without change and completed. If the amount of time variation of the instantaneous amount of heat generated per unit volume differs from the time variation curve, the current passage amount is controlled in order to compensate for the difference within a remaining welding time in the main current passage in the actual welding so that the cumulative amount of heat generated per unit volume in the main current passage in the actual welding matches the cumulative amount of heat generated per unit volume set as the target.

A method of calculating the amount of heat generated is not limited. PTL 5 describes an example of the method, which may be used herein. The following is the procedure of calculating the amount q of heat generated per unit volume and per unit time and the cumulative amount Q of heat generated per unit volume according to this method.

Let t be the total thickness of the parts to be welded, r be the electrical resistivity of the parts to be welded, V be the voltage between the electrodes, I be the welding current, and S be the contact area of the electrodes and the parts to be welded. In this case, the welding current passes through a columnar portion whose cross-sectional area is S and thickness is t, to generate heat by resistance. The amount q of heat generated per unit volume and per unit time in the columnar portion is given by the following Equation (1):

$$q=(V \cdot I)/(S \cdot t) \ldots \quad (1).$$

The electrical resistance R of the columnar portion is given by the following Equation (2):

$$R=(r \cdot t)/S \ldots \quad (2).$$

Solving Equation (2) for S and substituting the solution into Equation (1) yields the amount q of heat generated as indicated by the following Equation (3):

$$q=(V \cdot I \cdot R)/(r \cdot t^2)=(V^2)/(r \cdot t^2) \ldots \quad (3).$$

As is clear from Equation (3), the amount q of heat generated per unit volume and per unit time can be calculated from the voltage V between the electrodes, the total thickness t of the parts to be welded, and the electrical resistivity r of the parts to be welded, and is not affected by the contact area S of the electrodes and the parts to be welded. Although the amount of heat generated is calculated from the voltage V between the electrodes in Equation (3), the amount q of heat generated may be calculated from the interelectrode current I. The contact area S of the electrodes and the parts to be welded need not be used in this case, either. By cumulating the amount q of heat generated per unit volume and per unit time for the welding time, the cumulative amount Q of heat generated per unit volume for the welding is obtained. As is clear from Equation (3), the cumulative amount Q of heat generated per unit volume can also be calculated without using the contact area S of the electrodes and the parts to be welded.

Although the above describes the case of calculating the cumulative amount Q of heat generated by the method described in PTL 5, the cumulative amount Q may be calculated by any other method.

In the subsequent current passage in the actual welding, too, adaptive control is performed to control a current passage amount with the time variation curve of the instantaneous amount of heat generated per unit volume and the cumulative amount of heat generated that are stored in the subsequent current passage in the test welding being set as the target.

In one of the disclosed embodiments, the subsequent current passage in the test welding is performed by constant current control under a more appropriate condition, that is, under the condition that $0.2 \leq Vtp/Vtm \leq 1.5$, as described above.

Therefore, by storing the time variation curve of the instantaneous amount of heat generated per unit volume and the cumulative amount of heat generated per unit volume in the subsequent current passage in the test welding and performing the subsequent current passage in the actual welding by adaptive control using the stored values as the target, even in the case where there is a disturbance, the amount of heat suitable for subsequent heat treatment can be generated and as a result the predetermined heat treatment effect can be achieved.

In each of the test welding and the actual welding, a cooling time may be set between the main current passage and the subsequent current passage. The cooling time is preferably in a range of 20 ms to 3000 ms.

Figure 2A:
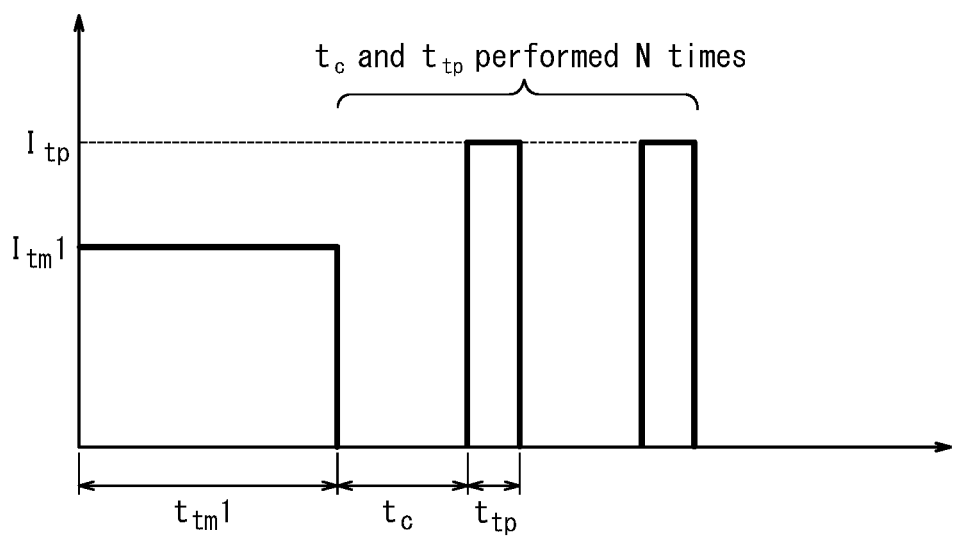
FIG. 2A is a diagram illustrating an example of a current pattern in test welding in the case where main current passage is one-step current passage.
Figure 2B:
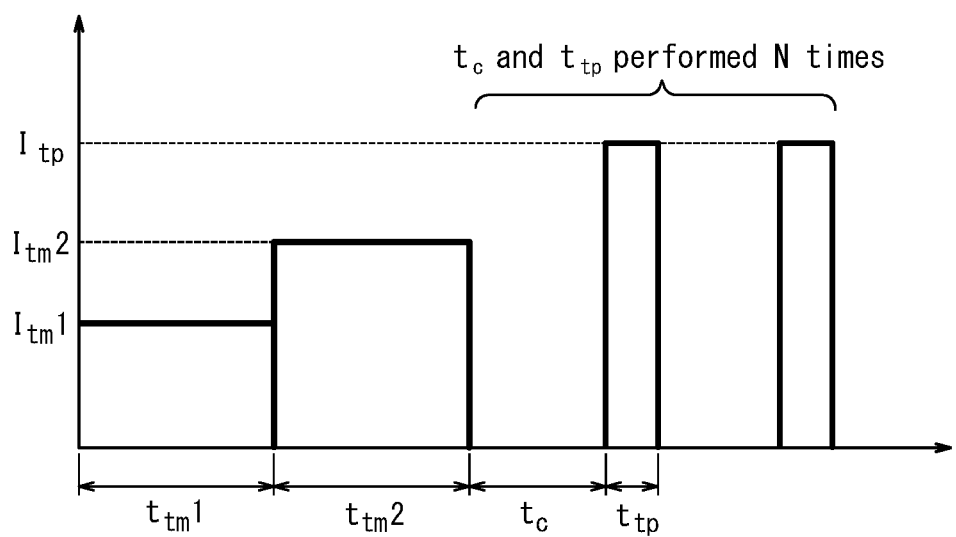
FIG. 2B is a diagram illustrating an example of a current pattern in test welding in the case where main current passage is two-step current passage.

In the test welding, the number of times a welding interval for the cooling time and the subsequent current passage are performed after the main current passage may be two or more times, as illustrated in FIGS. 2A and 2B (the number of times the welding interval for the cooling time and the subsequent current passage are performed after the main current passage is defined as the number of repetitions N). In this way, the predetermined heat treatment effect can be achieved more favorably. Even if heat is generated excessively in the first subsequent current passage and remelting occurs, by performing heat treatment in the second subsequent current passage, the effect of improving joint strength can be achieved. No upper limit is placed on the number of repetitions, but the upper limit of the number of repetitions is preferably about 10. The welding time, the cooling time, and the current may be different each time.

In the case where the number of repetitions of the welding interval for the cooling time and the subsequent current passage after the main current passage is two or more times, the current Itp in the subsequent current passage in the test welding is a value obtained by dividing a time integration value of the current in the subsequent current passage by the total welding time in the subsequent current passage excluding the cooling time.

The conditions in the actual welding other than those described above may be basically the same as the conditions in the test welding.

The parts to be welded or the sheet combination used is not limited. The resistance spot welding method may be used for steel sheets and coated steel sheets having various strengths from mild steel to ultra high tensile strength steel. The resistance spot welding method may also be used for a sheet combination of three or more overlapping steel sheets, and is particularly advantageous in the case where one or more steel sheets of the sheet combination has a tensile strength of 590 MPa or more.

In each of the test welding and the actual welding, the electrode force in the current passage may be constant, or be changed as appropriate. A preferable range of the electrode force varies depending on which sheet combination is used as the parts to be welded. For example, in the case of using a sheet combination of two overlapping steel sheets of 980 MPa-grade in tensile strength (TS) and 1.2 mm to 1.6 mm in sheet thickness, the electrode force is preferably in a range of 1.5 kN to 10.0 kN.

By joining a plurality of overlapping metal sheets by the resistance spot welding method described above, various high-strength weld members, in particular weld members of automotive parts and the like, are produced while stably ensuring a desired nugget diameter by effectively responding to variations in the disturbance state.

EXAMPLES

The presently disclosed techniques will be described below, by way of examples. The conditions in the examples are one example of conditions employed to determine the operability and effects of the presently disclosed techniques, and the present disclosure is not limited to such example of conditions. Various conditions can be used in the present disclosure as long as the object of the present disclosure is fulfilled, without departing from the scope of the present disclosure.

Test welding was performed under the conditions listed in Table 2 for each sheet combination of two or three overlapping metal sheets listed in Table 1, and then actual welding was performed under the conditions listed in Table 3 for the same sheet combination, to produce a weld joint (L-shaped tensile test piece).

FIGS. 2A and 2B illustrate current patterns in the test welding. FIG. 2A illustrates a current pattern in the case where the main current passage is one-step current passage, and FIG. 2B illustrates a current pattern in the case where the main current passage is two-step current passage.

Figure 3A:
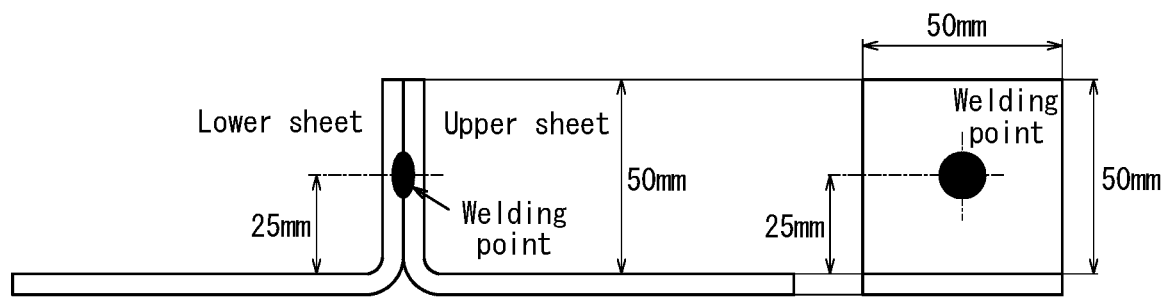
FIG. 3A is a diagram illustrating an L-shaped tensile test piece used in examples in the case where the number of overlapping metal sheets is two and there is no existing weld.
Figure 3B:
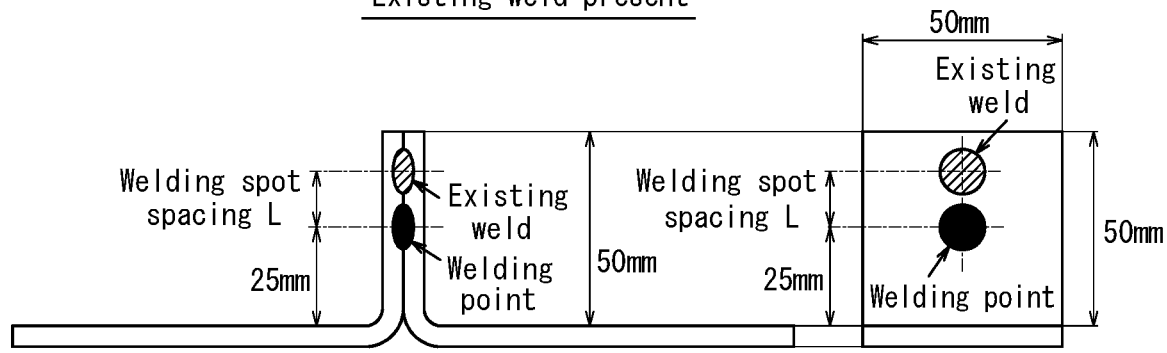
FIG. 3B is a diagram illustrating an L-shaped tensile test piece used in examples in the case where the number of overlapping metal sheets is two and there is an existing weld.
Figure 4A:
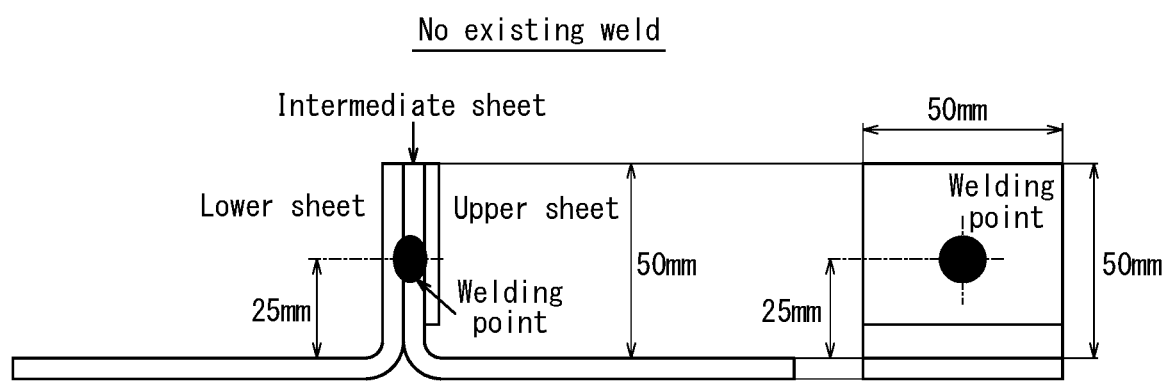
FIG. 4A is a diagram illustrating an L-shaped tensile test piece used in examples in the case where the number of overlapping metal sheets is three and there is no existing weld.
Figure 4B:
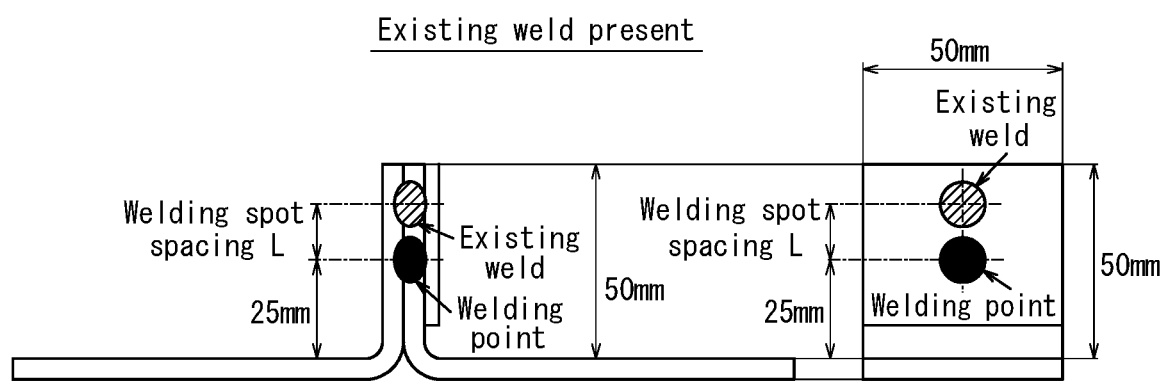
FIG. 4B is a diagram illustrating an L-shaped tensile test piece used in examples in the case where the number of overlapping metal sheets is three and there is an existing weld.

The test welding was performed in a state in which there was no disturbance, as illustrated in FIGS. 3A and 4A. The actual welding was performed in a state in which there was no disturbance as in the test welding, and in a state in which there was a disturbance as illustrated in FIGS. 3B and 4B.

FIG. 3A illustrates a state in which the number of overlapping metal sheets is two and there is no existing weld. FIG. 3B illustrates a state in which the number of overlapping metal sheets is two and there is an existing weld. The welding spot spacing L (center-to-center spacing) between the existing weld and the welding point (current welding point) was varied.

FIG. 4A illustrates a state in which the number of overlapping metal sheets is three and there is no existing weld. FIG. 4B illustrates a state in which the number of overlapping metal sheets is three and there is an existing weld.

The "welding time in subsequent current passage" in the test welding condition in Table 2 is the welding time per one subsequent current passage. The cooling time, the current in subsequent current passage, and the welding time in subsequent current passage in the test welding condition in Table 2 were the same for each subsequent current passage.

In the "control method of main current passage" and "control method of subsequent current passage" in the actual welding condition in Table 3, "constant current control" indicates constant current control performed under the same condition as in the test welding.

In the case where actual welding was performed in a state in which there was an existing weld, the below-described tensile test was conducted after cutting off the part of the existing weld from the L-shaped tensile test piece.

An inverter DC resistance spot welder was used as the welder, and chromium copper electrodes with 6 mm face diameter DR-shaped tips were used as the electrodes.

Each obtained L-shaped tensile test piece was used to conduct a tensile test at a tension rate (in longitudinal direction) of 10 mm/min, and the joint strength (L-shape tensile strength (LTS)) was measured. Based on whether expulsion occurred in welding and the joint strength, evaluation was performed in the following three levels:

A: LTS was 2.0 kN or more regardless of welding spot spacing L, and no expulsion occurred.
B: LTS was 2.0 kN or more when there was no existing weld or when welding spot spacing L≥10 mm, LTS was less than 2.0 kN when welding spot spacing L<10 mm, and no expulsion occurred.
F: LTS was less than 2.0 kN when there was no existing weld or when welding spot spacing L≥10 mm, or expulsion occurred.

TABLE 1

| Sheet combination ID | Upper sheet | Intermediate sheet | Lower sheet |
| --- | --- | --- | --- |
| A1 | 1180 MPa-grade cold-rolled steel sheet (sheet thickness: 1.6 mm) | | 1180 MPa-grade cold-rolled steel sheet (sheet thickness: 1.6 mm) |
| A2 | 980 MPa-grade cold-rolled steel sheet (sheet thickness: 1.6 mm) | | 980 MPa-grade cold-rolled steel sheet (sheet thickness: 1.6 mm) |
| A3 | 980 MPa-grade cold-rolled steel sheet (sheet thickness: 1.2 mm) | | 1470 MPa-grade cold-rolled steel sheet (sheet thickness: 1.4 mm) |
| A4 | 980 MPa-grade GA steel sheet (sheet thickness: 1.2 mm) | | 1470 MPa-grade GA steel sheet (sheet thickness: 2.0 mm) |
| A5 | 1470 MPa-grade GA steel sheet (sheet thickness: 1.4 mm) | | 1470 MPa-grade GA steel sheet (sheet thickness: 1.4 mm) |

TABLE 1-continued

| Sheet combination ID | Upper sheet | Intermediate sheet | Lower sheet |
|---|---|---|---|
| A6 | 1800 MPa-grade noncoated hot stamp steel sheet (sheet thickness: 1.4 mm) | | 980 MPa-grade GA steel sheet (sheet thickness: 1.2 mm) |
| A7 | 1800 MPa-grade Zn-Ni-coated hot stamp steel sheet (sheet thickness: 1.6 mm) | | 1180 MPa-grade cold-rolled steel sheet (sheet thickness: 1.4 mm) |
| A8 | 1470 MPa-grade cold-rolled steel sheet (sheet thickness: 1.4 mm) | | 1470 MPa-grade cold-rolled steel sheet (sheet thickness: 1.4 mm) |
| B1 | 270 MPa-grade GA steel sheet (sheet thickness: 0.7 mm) | 1470 MPa-grade GA steel sheet (sheet thickness: 1.4 mm) | 1470 MPa-grade GA steel sheet (sheet thickness: 1.4 mm) |

TABLE 2

| | | | Main current passage | | | | | Subsequent current passage | | | | | |
|---|---|---|---|---|---|---|---|---|---|---|---|---|---|
| No. | Sheet combination ID | Electrode force F (kN) | Current 1 in main current passage $I_{tm}1$ (kA) | Welding time 1 in main current passage $t_{tm}1$ (ms) | Current 2 in main current passage $I_{tm}2$ (kA) | Welding time 2 in main current passage $t_{tm}2$ (ms) | Average of voltage between electrodes in main current passage $V_{tm}$ (V) | Cooling time $t_c$ (ms) | Current in subsequent current passage $I_{tp}$ (kA) | Welding time in subsequent current passage $t_{tp}$ (ms) | Number of repetitions N (times) | Average of voltage between electrodes in subsequent current passage $V_{tp}$ (V) | $V_{tp}/V_{tm}$ | Remarks |
| 1 | 1-1 A1 / 1-2 A1 / 1-3 A1 | 5.5 | 7.0 | 320 | — | — | 1.2 | 160 | 10.0 | 60 | 2 | 1.3 | 1.1 | Ex. |
| 2 | 2-1 A1 / 2-2 A1 / 2-3 A1 | 5.5 | 7.0 | 320 | — | — | 1.2 | 80 | 11.0 | 60 | 1 | 1.3 | 1.1 | Ex. |
| 4 | 4-1 A1 / 4-2 A1 / 4-3 A1 | 5.5 | 7.0 | 400 | — | — | 1.0 | 160 | 12.5 | 40 | 2 | 1.6 | 1.6 | Comp. Ex. |
| 5 | 5-1 A1 / 5-2 A1 / 5-3 A1 | 5.5 | 5.0 | 100 | 7 | 240 | 1.1 | 160 | 10.0 | 60 | 2 | 1.2 | 1.1 | Ex. |
| 6 | 6-1 A1 / 6-2 A1 / 6-3 A1 | 5.5 | 7.0 | 320 | — | — | 1.2 | 120 | 5.5 | 100 | 1 | 0.9 | 0.8 | Comp. Ex. |
| 7 | 7-1 A1 / 7-2 A1 / 7-3 A1 | 5 | 6.0 | 340 | — | — | 1.1 | 160 | 9.0 | 60 | 10 | 0.9 | 0.8 | Ex. |
| 8 | 8-1 A2 / 8-2 A2 / 8-3 A2 | 4.5 | 6.0 | 300 | — | — | 1.1 | 160 | 8.5 | 60 | 2 | 1.0 | 0.9 | Ex. |
| 9 | 9-1 A3 / 9-2 A3 / 9-3 A3 | 5.5 | 6.0 | 280 | — | — | 1.1 | 20 | 7.0 | 40 | 2 | 1.3 | 1.2 | Ex. |
| 10 | 10-1 A4 / 10-2 A4 / 10-3 A4 | 5.0 | 4.0 | 120 | 5.5 | 300 | 1.2 | 80 | 7.0 | 60 | 3 | 1.1 | 0.9 | Ex. |
| 11 | 11-1 A5 / 11-2 A5 / 11-3 A5 | 5.0 | 4.5 | 140 | 5.5 | 320 | 1.0 | 80 | 6.0 | 60 | 2 | 1.0 | 1.0 | Ex. |
| 12 | 12-1 A6 / 12-2 A6 / 12-3 A6 | 5.0 | 4.5 | 140 | 7.5 | 320 | 1.1 | 80 | 9.0 | 60 | 2 | 1.0 | 0.9 | Ex. |
| 13 | 13-1 B1 / 13-2 B1 / 13-3 B1 | 5.0 | 7.0 | 320 | — | — | 1.2 | 80 | 8.5 | 60 | 2 | 1.3 | 1.1 | Ex. |
| 14 | 14-1 B1 / 14-2 B1 / 14-3 B1 | 5.0 | 4.5 | 140 | 7.5 | 320 | 1.1 | 20 | 8.5 | 40 | 2 | 1.3 | 1.2 | Ex. |
| 15 | 15-1 A1 / 15-2 A1 / 15-3 A1 | 4.5 | 7.0 | 320 | — | — | 1.3 | 100 | 3.0 | 80 | 2 | 0.5 | 0.4 | Comp. Ex. |
| 16 | 16-1 A1 / 16-2 A1 / 16-3 A1 | 5.5 | 8.0 | 200 | — | — | 1.5 | 200 | 2.0 | 60 | 2 | 0.2 | 0.1 | Comp. Ex. |

TABLE 2-continued

| | | | Test welding condition | | | | | | | | | | | |
|---|---|---|---|---|---|---|---|---|---|---|---|---|---|---|
| | | | | Main current passage | | | | | | Subsequent current passage | | | | |
| No. | Sheet combination ID | Electrode force F (kN) | Current 1 in main current passage $I_{tm}1$ (kA) | Welding time 1 in main current passage $t_{tm}1$ (ms) | Current 2 in main current passage $I_{tm}2$ (kA) | Welding time 2 in main current passage $t_{tm}2$ (ms) | Average of voltage between electrodes in main current passage $V_{tm}$ (V) | Cooling time $t_c$ (ms) | Current in subsequent current passage $I_{tp}$ (kA) | Welding time in subsequent current passage $t_{tp}$ (ms) | Number of repetitions N (times) | Average of voltage between electrodes in subsequent current passage $V_{tp}$ (V) | $V_{tp}/V_{tm}$ | Remarks |
| 17 | 19-1 | 5.5 | 5.0 | 220 | 7.0 | 300 | 1.1 | 1500 | 5.0 | 2000 | 1 | 0.4 | 0.4 | Ex. |
| | 19-2 A7 | | | | | | | | | | | | | |
| | 19-3 A7 | | | | | | | | | | | | | |
| 18 | 20-1 A8 | 4.8 | 6.2 | 320 | — | — | 0.9 | 850 | 4.4 | 1000 | 1 | 0.4 | 0.4 | Ex. |
| | 20-2 A8 | | | | | | | | | | | | | |
| | 20-3 A8 | | | | | | | | | | | | | |

(Row 17 Sheet combination ID: A7; Row 18 Sheet combination ID: A8)

TABLE 3

| | | | | Actual welding condition | | | | | |
|---|---|---|---|---|---|---|---|---|---|
| No. | Sheet combination ID | Welding spot spacing L | Electrode force F (kN) | Main current passage Control method of main current passage | Subsequent current passage Control method of subsequent current passage | LTS (kN) | Expulsion | Evaluation | Remarks |
| 1 | 1-1 A1 | No existing weld | 5.5 | Adaptive control | Adaptive control | 3.3 | None | A | Ex. |
| | 1-2 A1 | 10 mm | | | | 3.4 | None | | |
| | 1-3 A1 | 7 mm | | | | 3.3 | None | | |
| 2 | 2-1 A1 | No existing weld | 5.5 | Adaptive control | Adaptive control | 2.9 | None | B | Ex. |
| | 2-2 A1 | 10 mm | | | | 2.6 | None | | |
| | 2-3 A1 | 7 mm | | | | 1.4 | None | | |
| 4 | 4-1 A1 | No existing weld | 5.5 | Adaptive control | Adaptive control | 2.8 | None | F | Comp. Ex. |
| | 4-2 A1 | 10 mm | | | | 2.7 | None | | |
| | 4-3 A1 | 7 mm | | | | 1.8 | Occurred | | |
| 5 | 5-1 A1 | No existing weld | 5.5 | Adaptive control | Adaptive control | 3.4 | None | A | Ex. |
| | 5-2 A1 | 10 mm | | | | 3.4 | None | | |
| | 5-3 A1 | 7 mm | | | | 3.1 | None | | |
| 6 | 6-1 A1 | No existing weld | 5.5 | Constant current control | Constant current control | 2.8 | None | F | Comp. Ex. |
| | 6-2 A1 | 10 mm | | | | 1.1 | None | | |
| | 6-3 A1 | 7 mm | | | | 0.9 | None | | |
| 7 | 7-1 A1 | No existing weld | 5 | Adaptive control | Adaptive control | 3.4 | None | A | Ex. |
| | 7-2 A1 | 10 mm | | | | 3.6 | None | | |
| | 7-3 A1 | 7 mm | | | | 3.3 | None | | |
| 8 | 8-1 A2 | No existing weld | 4.5 | Adaptive control | Adaptive control | 3.4 | None | A | Ex. |
| | 8-2 A2 | 10 mm | | | | 3.2 | None | | |
| | 8-3 A2 | 7 mm | | | | 3.3 | None | | |
| 9 | 9-1 A3 | No existing weld | 5.5 | Adaptive control | Adaptive control | 2.8 | None | A | Ex. |
| | 9-2 A3 | 10 mm | | | | 2.9 | None | | |
| | 9-3 A3 | 7 mm | | | | 2.7 | None | | |
| 10 | 10-1 A4 | No existing weld | 5.0 | Adaptive control | Adaptive control | 3.1 | None | A | Ex. |
| | 10-2 A4 | 10 mm | | | | 2.9 | None | | |
| | 10-3 A4 | 7 mm | | | | 3.0 | None | | |
| 11 | 11-1 A5 | No existing weld | 5.0 | Adaptive control | Adaptive control | 2.9 | None | A | Ex. |
| | 11-2 A5 | 10 mm | | | | 2.8 | None | | |
| | 11-3 A5 | 7 mm | | | | 2.7 | None | | |
| 12 | 12-1 A6 | No existing weld | 5.0 | Adaptive control | Adaptive control | 2.5 | None | A | Ex. |
| | 12-2 A6 | 10 mm | | | | 2.6 | None | | |
| | 12-3 A6 | 7 mm | | | | 2.6 | None | | |
| 13 | 13-1 B1 | No existing weld | 5.0 | Adaptive control | Adaptive control | 3.0 | None | A | Ex. |
| | 13-2 B1 | 10 mm | | | | 3.0 | None | | |
| | 13-3 B1 | 7 mm | | | | 2.9 | None | | |
| 14 | 14-1 B1 | No existing weld | 5.0 | Adaptive control | Adaptive control | 2.3 | None | A | Ex. |
| | 14-2 B1 | 10 mm | | | | 2.4 | None | | |
| | 14-3 B1 | 7 mm | | | | 2.2 | None | | |
| 15 | 15-1 A1 | No existing weld | 4.5 | Adaptive control | Constant current control | 2.5 | None | F | Comp. Ex. |
| | 15-2 A1 | 10 mm | | | | 1.8 | None | | |
| | 15-3 A1 | 7 mm | | | | 1.6 | None | | |

TABLE 3-continued

| | No. | Sheet combination ID | Welding spot spacing L | Electrode force F (kN) | Main current passage Control method of main current passage | Subsequent current passage Control method of subsequent current passage | LTS (kN) | Expulsion | Evaluation | Remarks |
|---|---|---|---|---|---|---|---|---|---|---|
| 16 | 16-1 | A1 | No existing weld | 4.5 | Adaptive control | Adaptive control | 1.9 | None | F | Comp. Ex. |
| | 16-2 | A1 | 10 mm | | | | 1.8 | None | | |
| | 16-3 | A1 | 7 mm | | | | 1.9 | None | | |
| 17 | 17-1 | A7 | No existing weld | 5.5 | Adaptive control | Adaptive control | 2.4 | None | A | Ex. |
| | 17-2 | A7 | 10 mm | | | | 2.6 | None | | |
| | 17-3 | A7 | 7 mm | | | | 2.3 | None | | |
| 18 | 18-1 | A8 | No existing weld | 4.8 | Adaptive control | Adaptive control | 2.6 | None | A | Ex. |
| | 18-2 | A8 | 10 mm | | | | 2.5 | None | | |
| | 18-3 | A8 | 7 mm | | | | 2.5 | None | | |

A: LTS was 2.0 kN or more regardless of welding spot spacing L, and no expulsion occured.
B: LTS was 2.0 kN or more when there was no existing weld or when welding spot spacing L ≥ 10 mm, LTS was less than 2.0 kN when welding spot spacing L < 10 mm, and no expulsion occured.
F: LTS was less than 2.0 kN when there was no existing weld or when welding spot spacing L ≥ 10 mm, or expulsion occured.

As can be seen in Table 3, all Examples (Ex.) were evaluated as A or B. In particular, all Examples in which the number of repetitions of the welding interval for the cooling time and the subsequent current passage after the main current passage was two or more times were evaluated as A.

All Comparative Examples (Comp. Ex.) not satisfying the appropriate conditions were evaluated as F, and could not obtain sufficient joint strength.

The invention claimed is:

1. A resistance spot welding method of squeezing, by a pair of electrodes, parts to be welded which are a plurality of overlapping metal sheets, and passing a current while applying an electrode force to join the parts to be welded, the resistance spot welding method comprising:

performing test welding; and
performing actual welding after the test welding, wherein
(a) in the test welding, main current passage for nugget formation and subsequent current passage for subsequent heat treatment are performed,
in the main current passage in the test welding, a time variation curve of an instantaneous amount of heat generated per unit volume and a cumulative amount of heat generated per unit volume that are calculated from an electrical property between the electrodes in forming an appropriate nugget by performing current passage by constant current control are stored, and
in the subsequent current passage in the test welding, current passage is performed by constant current control under a condition:
$0.2 \leq Vtp/Vtm \leq 1.5$,
where Vtm is an average value of a voltage between the electrodes in the main current passage in the test welding and Vtp is an average value of a voltage between the electrodes in the subsequent current passage in the test welding, and a time variation curve of an instantaneous amount of heat generated per unit volume and a cumulative amount of heat generated per unit volume that are calculated from an electrical property between the electrodes in the current passage performed under the condition are stored, and
(b) thereafter, in the actual welding, main current passage for nugget formation and subsequent current passage for subsequent heat treatment are performed, and in the main current passage and the subsequent current passage in the actual welding, the time variation curve of the instantaneous amount of heat generated per unit volume and the cumulative amount of heat generated per unit volume that are stored in the main current passage in the test welding and the time variation curve of the instantaneous amount of heat generated per unit volume and the cumulative amount of heat generated per unit volume that are stored in the subsequent current passage in the test welding are respectively set as a target, and adaptive control welding is performed to control a current passage amount according to the target.

2. The resistance spot welding method according to claim 1, wherein in the adaptive control welding in the main current passage in the actual welding, in the case where an amount of time variation of an instantaneous amount of heat generated per unit volume differs from the time variation curve of the instantaneous amount of heat generated per unit volume set as the target, the current passage amount is controlled in order to compensate for the difference from the time variation curve within a remaining welding time in the main current passage in the actual welding so that a cumulative amount of heat generated per unit volume in the main current passage in the actual welding matches the cumulative amount of heat generated per unit volume set as the target.

3. The resistance spot welding method according to claim 2, wherein in the adaptive control welding in the subsequent current passage in the actual welding, in the case where an amount of time variation of an instantaneous amount of heat generated per unit volume differs from the time variation curve of the instantaneous amount of heat generated per unit volume set as the target, the current passage amount is controlled in order to compensate for the difference from the time variation curve within a remaining welding time in the subsequent current passage in the actual welding so that a cumulative amount of heat generated per unit volume in the subsequent current passage in the actual welding matches the cumulative amount of heat generated per unit volume set as the target.

4. The resistance spot welding method according to claim 3, wherein a cooling time is set between the main current passage and the subsequent current passage in the test welding, and the number of repetitions of a welding interval for the cooling time and the subsequent current passage after the main current passage in the test welding is two or more times.

5. The resistance spot welding method according to claim 2, wherein a cooling time is set between the main current passage and the subsequent current passage in the test welding, and the number of repetitions of a welding interval for the cooling time and the subsequent current passage after the main current passage in the test welding is two or more times.

6. The resistance spot welding method according to claim 1, wherein in the adaptive control welding in the subsequent current passage in the actual welding, in the case where an amount of time variation of an instantaneous amount of heat generated per unit volume differs from the time variation curve of the instantaneous amount of heat generated per unit volume set as the target, the current passage amount is controlled in order to compensate for the difference from the time variation curve within a remaining welding time in the subsequent current passage in the actual welding so that a cumulative amount of heat generated per unit volume in the subsequent current passage in the actual welding matches the cumulative amount of heat generated per unit volume set as the target.

7. The resistance spot welding method according to claim 6, wherein a cooling time is set between the main current passage and the subsequent current passage in the test welding, and the number of repetitions of a welding interval for the cooling time and the subsequent current passage after the main current passage in the test welding is two or more times.

8. The resistance spot welding method according to claim 1, wherein a cooling time is set between the main current passage and the subsequent current passage in the test welding, and the number of repetitions of a welding interval for the cooling time and the subsequent current passage after the main current passage in the test welding is two or more times.

9. A weld member production method comprising joining a plurality of overlapping metal sheets by the resistance spot welding method according to claim 1.

10. A weld member production method comprising joining a plurality of overlapping metal sheets by the resistance spot welding method according to claim 2.

11. A weld member production method comprising joining a plurality of overlapping metal sheets by the resistance spot welding method according to claim 3.

12. A weld member production method comprising joining a plurality of overlapping metal sheets by the resistance spot welding method according to claim 8.

13. A weld member production method comprising joining a plurality of overlapping metal sheets by the resistance spot welding method according to claim 3.

14. A weld member production method comprising joining a plurality of overlapping metal sheets by the resistance spot welding method according to claim 5.

15. A weld member production method comprising joining a plurality of overlapping metal sheets by the resistance spot welding method according to claim 7.

16. A weld member production method comprising joining a plurality of overlapping metal sheets by the resistance spot welding method according to claim 4.

* * * * *